Patented Oct. 27, 1931

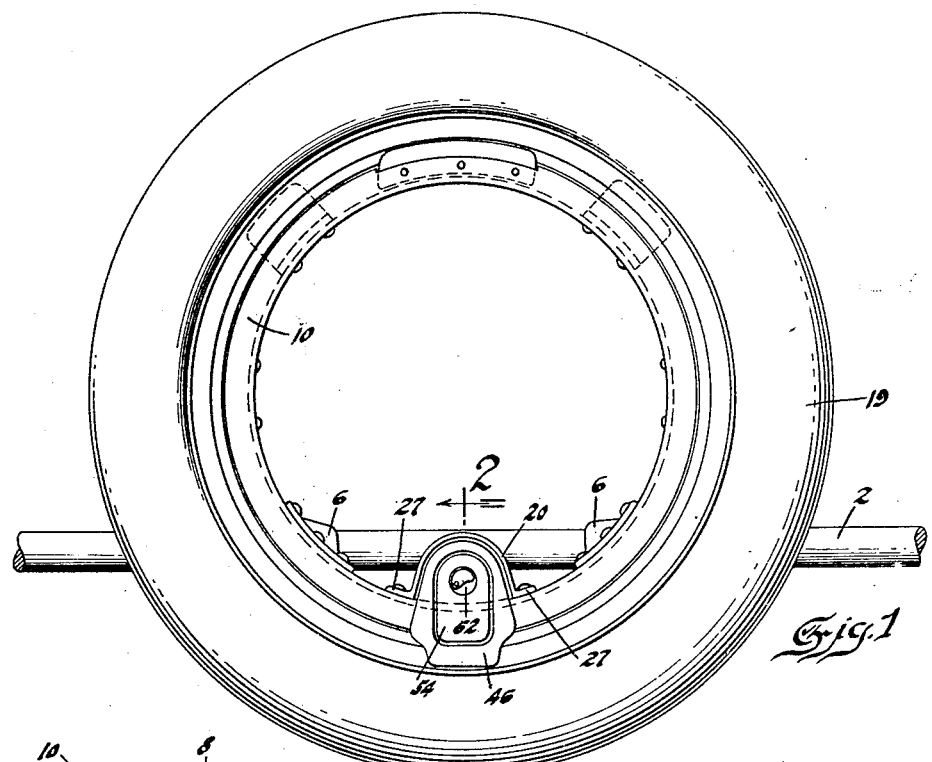
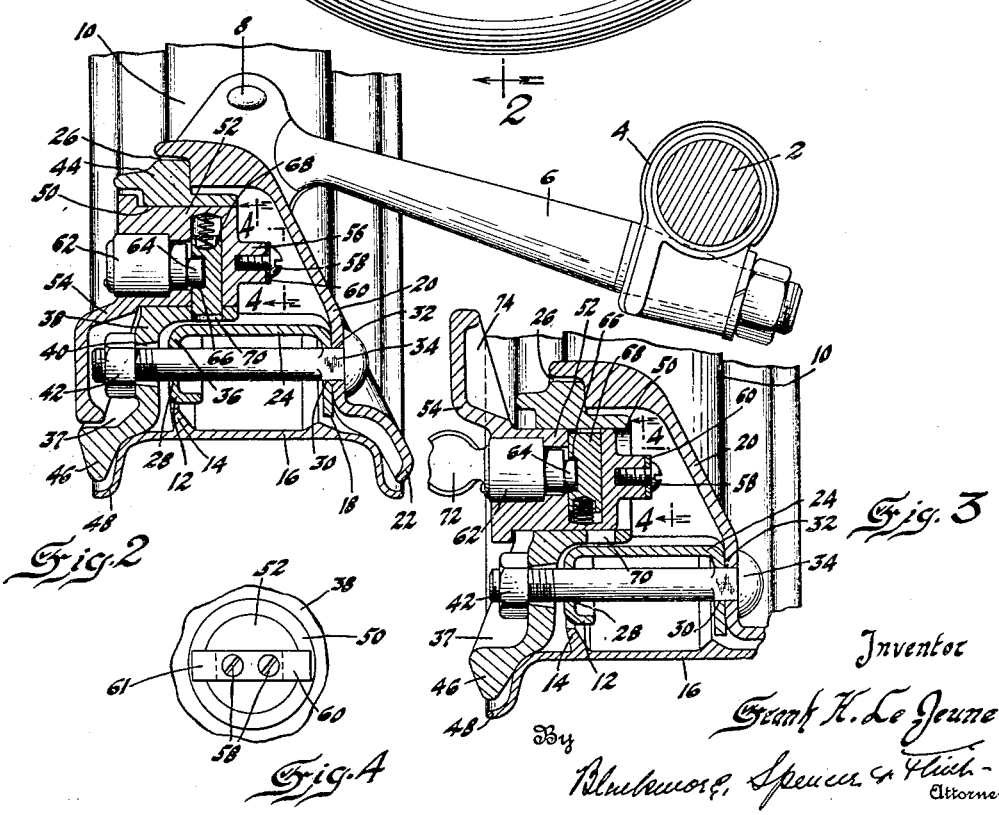

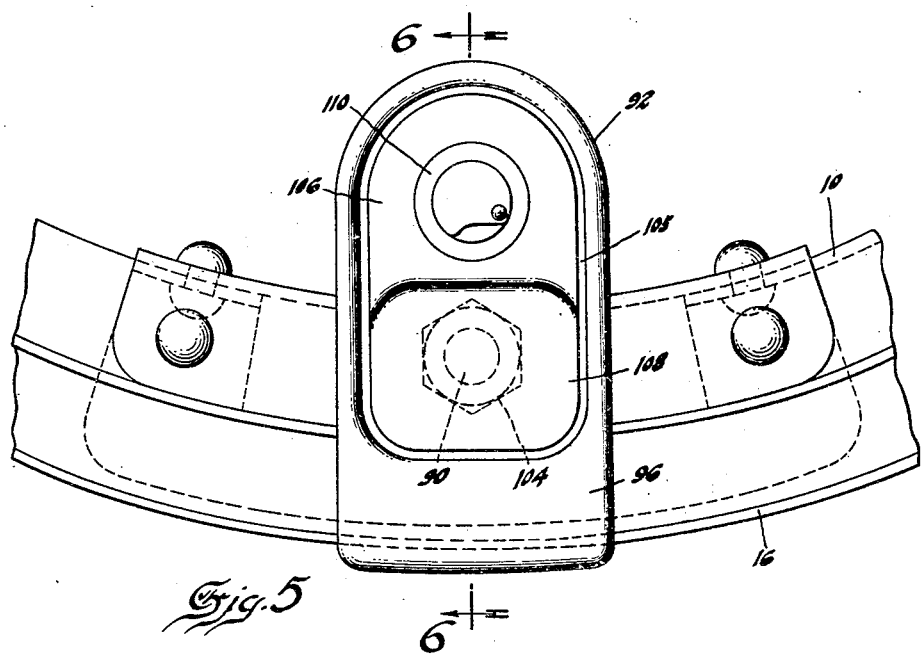
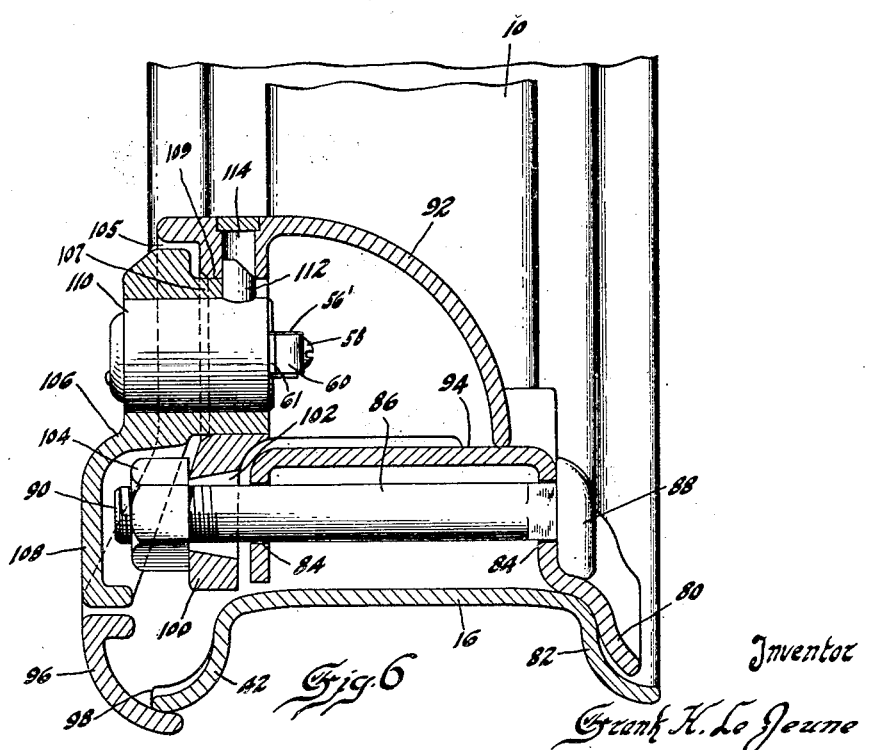

1,829,415

UNITED STATES PATENT OFFICE

FRANK H. LE JEUNE, OF JACKSON, MICHIGAN, ASSIGNOR TO GENERAL MOTORS CORPORATION, OF DETROIT, MICHIGAN, A CORPORATION OF DELAWARE

TIRE CARRIER LOCK

Application filed January 18, 1929. Serial No. 333,309.

This invention relates to locks, and has particular reference to locks used for securing a spare tire and rim to an automotive vehicle.

Locks of the type to which the present invention relates usually make use of a bolt which extends through a frame or support on which the rim of the spare tire is mounted. A pair of clamps is mounted at the frame sides which holds the rim removably but rigidly on the frame through the intermediary of a bolt and nut. Various devices have been devised in order to lock the nut securely to the bolt end, and thereby prevent removal and theft of the tire.

It is an object of the present invention to devise a new type of lock in which the closure or locking member for the nut or operable part of the securing mechanism will be rotatable when in unlocked position, in order that it may be swung out of the way of the nut and allow the application of a wrench or other suitable tool to the nut.

The closure or housing of the present invention, in addition to being rotatable, is bodily movable at right angles to the plane of rotation. This body movement is necessary in order that the closure may be swung to free it from the securing nut. A suitable retaining member in the form of a flat spring is secured to an extension on the closure to limit its movement and to hold it in position.

As a modification of the invention the closure or housing member may be made removable and a different type of clamping member applied. The clamping member may fit against the sides of the frame and rim and project over the inner portion only of the frame or support and be removable when the parts are in unlocked position.

On the drawings:

Figure 1 shows a rear view of a spare tire in position on the tire carrier of an automotive vehicle.

Figure 2 is a section on the line 2—2 of Figure 1.

Figure 3 is a view of the parts shown in Figure 2, but with the closure unlocked and swung to a position to free the locking nut.

Figure 4 is a detailed view taken on the line 4—4 of Figures 2 and 3.

Figure 5 is a view corresponding to Figure 1 of a modification.

Figure 6 is a section on the line 6—6 of Figure 5.

Referring to the drawings, the numeral 2 indicates a bar secured across the rear of an automotive vehicle. On the bar 2 there are mounted by means of the sleeves 4 the clamping arms 6, to the ends of which there is secured by means of the rivets 8 the frame or rim 10. The frame is shown in the form of a ring, although it may be a spider or other suitable mounting means. The frame as shown in Figures 2 and 3 is channel-shaped in cross section, and has an inturned flange 12 at one side of the channel. The purpose of this flange is to accommodate a projection 14 on the rim 16 which holds the usual tire 19.

At the side of the inner flange 18 of the frame 10 there is applied the inner clamping member 20 forming a part of the tire securing means. The clamping member 20 has the broad terminal flange 22 extending below the flange 18 of the frame, the purpose of which is to retain the inner portion of the rim 16. The upper part of the clamping member 20 is in the form of a housing, and extends well over the web 24 of the frame 10, and at its outer side is provided with a recessed portion 26, the purpose of which will be later described. Ears 27 on the clamp 20 rest on and are riveted to the frame 10.

The flanges of the frame 10, as well as the clamping member 20, are provided with suitable openings indicated at 28, 30 and 32, for the reception of a bolt 34, the head of which abuts against and holds the clamping member 20 against the flange 18 of the frame 10.

Adjacent the second flange 36 of the frame 10, there is applied the second clamping member or lug 38. This member is provided with a opening 40 which conforms to the openings 28, 30 and 32, and is adapted to receive the threaded end of the bolt 34. Over the threaded end of the bolt and against the clamping lug 38, there is secured the nut 42 which forms the operable member of the locking means.

The upper portion of the clamping lug 38 is provided with the terminal portion 44 which conforms rather closely to the recessed portion 26 of the clamping member 20 to prevent the insertion of a sharp tool. The lower portion of the clamping lug 38 is provided with the relatively broad finger or tongue 46, which is adapted to strike against the flange 48 of the rim 16 to hold it rigidly in position against the frame 10 when the nut or operable member 42 is applied.

The upper portion of the clamping lug 38 is rounded or hollow to form an opening as shown at 50, and in this hollow portion or opening there is seated the rounded extension 52 of a closure or housing 54, which is adapted to fit closely over the nut 42 and into the flanges or extensions 37 of the clamping lug 38 when in locked position. The extension 52 is provided with a stud portion 56 to which there is secured by means of screws 58 a retaining member 60 in the form of a flat spring having bent ends 61. The purpose of the spring 60 is to limit the outward movement, or the movement to the left when considering the construction shown in Figures 2 and 3, of the clamp 38.

The extension 52 is provided with a rotatable lock barrel 62 which has an eccentric finger 64 on its end. The eccentric finger projects into a recess or groove 66 formed in a spring pressed locking pin 68, operating in a recess in the extension 52. The clamping lug 38 is provided with an opening 70 which conforms to the recess in the extension 52, and when the parts are in locked position is adapted to receive the end of the locking pin 68, as shown in Figure 2.

The locked position of the parts is shown in Figure 2. To unlock the structure of Figure 1, the key 72 is inserted in the lock barrel 62 and the eccentric pin 64 rotated so as to cause the withdrawal of the pin 68 from the opening 70. This will permit of the bodily withdrawal of the closure or housing 54 and its lock to the left when considering the structures of Figures 2 and 3. The movement to the left will be limited by the spring 60 striking against the edge of the opening 50. After the closure has been moved a given distance to the left, it will bring its lateral flanges or edges 74 free of the nut 42 and the clamp flanges 37, and permit the rotation of the closure and lock member in the opening 50 of the clamping lug 38. The unlocked position of the parts is now as shown in Figure 3, which will permit the application of a wrench or other suitable tool to the nut 42. After the nut has been loosened the clamping lug 38 and its associated parts may be bodily removed, which will free the finger 46 from the rim 48 and permit its withdrawal from the frame 10.

Referring to the species of Figs. 5 and 6, it will be seen that a modified type of tire lock has been provided. The frame or support 10 is provided with the integral flange 80 at its one side which is adapted to fit against the flange 82 of the rim 16. The frame 10 is provided with the openings 84 in which there is received the bolt 86, the head 88 of which abuts against one flange of the frame 10 and its threaded end 90 projects well past the flange on the opposite side of the frame.

A removable clamping or holding member 92 has an upper portion adapted to fit over the inner periphery of the frame as shown at 94, and a lower portion 96, hook shaped as at 98, to fit against the flange 42 of the rim 16. The clamp 92 is provided with a transverse portion 100 having an opening 102 through which the threaded end 90 of the bolt 86 is passed. A nut 104 is screwed onto the threaded end and when the parts are in the position shown in Fig. 6, the nut rigidly holds the clamp 92 against the frame and rim to rigidly hold the parts together.

The clamp 92 is provided with an opening 105 at its front portion and in this opening there is fitted the closure member 106. The closure has the portion 107 journalled in an opening 109 in the clamp 92, and the housing portion 108 at its lower end which fits over and conceals the nut 104. The space between the closure 106 and the opening 104 is somewhat exaggerated in Figs. 5 and 6 for purposes of clearer illustration, although the fit in actual practice is close to prevent the insertion of a sharp tool. A lock barrel 110 is secured in the portion 107 of the closure 106 and in the lock barrel there is received a lock of any suitable type adapted to operate the locking pin 112. The pin 112 is received in an opening 114 at the upper portion of the clamp 92. The outer end of the opening 114 is preferably suitably plugged. The lock barrel 110 is provided with a stud 56', a spring 60 having bent ends 61, and a screw 58, similar to the corresponding parts in Figs. 2 and 3.

The operation of the structure of Figs. 5 and 6 is as follows: The locked position of the parts is shown in Fig. 6 and when it is desired to unlock the mechanism and remove the rim and its tire, a key is inserted in the lock and the bolt shot from its present position to remove it from the opening 114. This will permit of the bodily withdrawal of the closure 106 within the limits allowed by the spring 60, allow the swinging or rotating of the closure on the portion 107 in opening 109, and render the nut 104 accessible. The nut may now be removed by the application of a wrench or any suitable tool and when removed the clamp 92 is likewise free and may be bodily withdrawn. This will release the rim and it may be withdrawn away from the frame 10.

I claim:

1. In a tire carrier lock, a frame for supporting the tire, means for removably securing the rim and frame together, a closure pivoted to and extending over the operable part of said means in locked position, an extension on said closure slidably and rotatably mounted in said means, means for limiting the sliding movement, a lock in said closure for locking said closure over said operable part, said closure adapted to partake of said slidable and rotary movement when in unlocked position.

2. The structure of claim 1, said limiting means comprising a spring secured to the end of said extension and overlapping on said securing means.

3. In a tire carrier lock, a frame for supporting the tire rim, interfitting means for removably securing the rim and frame together, a closure pivoted to said means and adapted to cover the operable part of said means when in locked position, a lock on said closure, a locking pin operable by said lock and adapted to extend into an opening in said means, means on said closure to retain it on the securing means but allowing a longitudinal movement relative to said securing means, said closure capable of rotary movement when in unlocked position to expose said operable part.

4. In a tire carrier locking means for the spare tires of vehicles, a support on which the tire rim is mounted, a bolt at the support having a projecting threaded end, a holding member fitting over one side of the rim and support, said member having an opening through which said threaded end passes, a nut on the threaded end to rigidly hold said member against said rim and support, a closure over the member concealing said nut, and means for locking said closure to said member, said holding member overlapping the inner part of said support and concealing one end of said locking means.

In testimony whereof I affix my signature.

FRANK H. LE JEUNE.